United States Patent [19]

Saunders

[11] 4,158,762

[45] Jun. 19, 1979

[54] APPARATUS AND METHOD FOR CUTTING AND HEAT SEALING WOVEN THERMOPLASTIC MATERIAL

[75] Inventor: Richard J. Saunders, San Jose, Calif.

[73] Assignee: Coherent, Inc., Palo Alto, Calif.

[21] Appl. No.: 866,942

[22] Filed: Jan. 4, 1978

[51] Int. Cl.² .............................................. B23K 9/00
[52] U.S. Cl. .............................................. 219/121 L
[58] Field of Search ..... 219/121 L, 121 LM, 121 EB, 219/121 EM; 29/559; 28/170 A; 139/291 C

[56] References Cited

U.S. PATENT DOCUMENTS

| 3,174,515 | 3/1965 | Lüber | 139/291 C |
| 3,313,323 | 4/1967 | Calemard | 28/170 X |
| 3,808,672 | 5/1974 | Castro | 29/559 |
| 3,848,327 | 11/1974 | Gerber | 29/559 |
| 3,880,201 | 4/1975 | Lee | 139/291 C |

*Primary Examiner*—J. V. Truhe
*Assistant Examiner*—Fred E. Bell
*Attorney, Agent, or Firm*—Limbach, Limbach & Sutton

[57] ABSTRACT

A method and apparatus for cutting and heat sealing the ends of lengths of woven thermoplastic material is disclosed with the apparatus including selectively activated means for feeding predetermined lengths of a material from a supply across the supporting surface. Means releasably clamp the material lengths against the supporting surface, with a gap extending transversely of the material lengths to expose portions of the material through the gap. A laser beam is directed against the exposed portions of the material, with the laser beam being moved transversely of that material along the gap and removing the material exposed to the laser beam and heat sealing the portions of the material immediately adjacent that removed.

14 Claims, 6 Drawing Figures

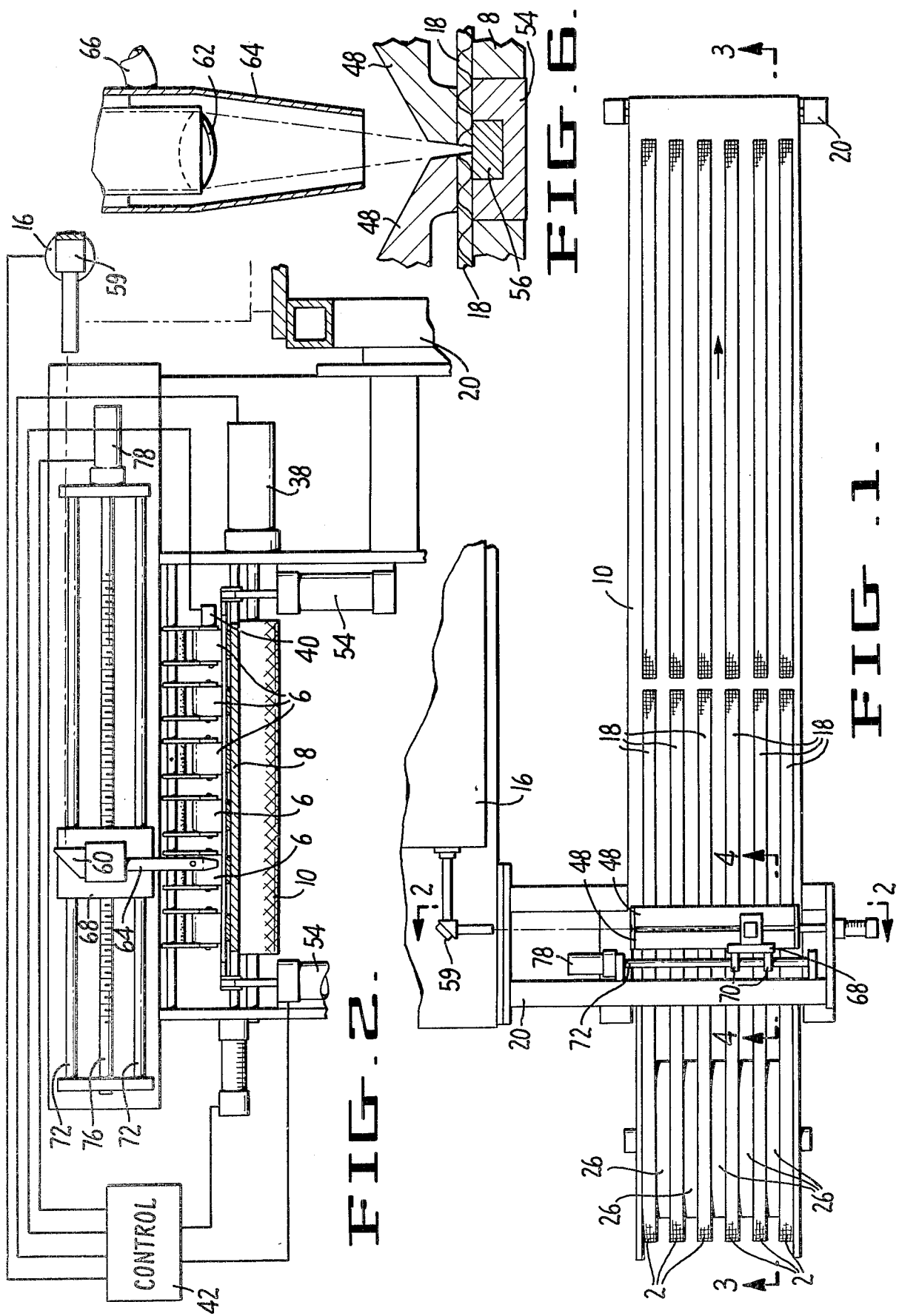

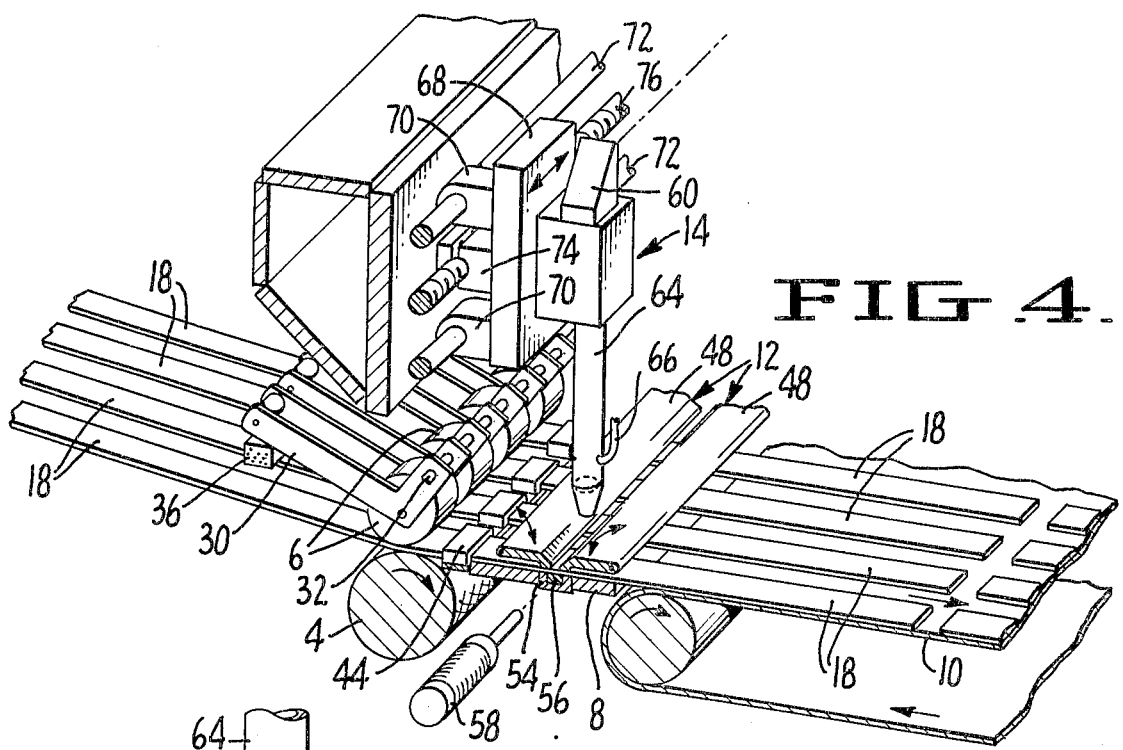
FIG. 4.
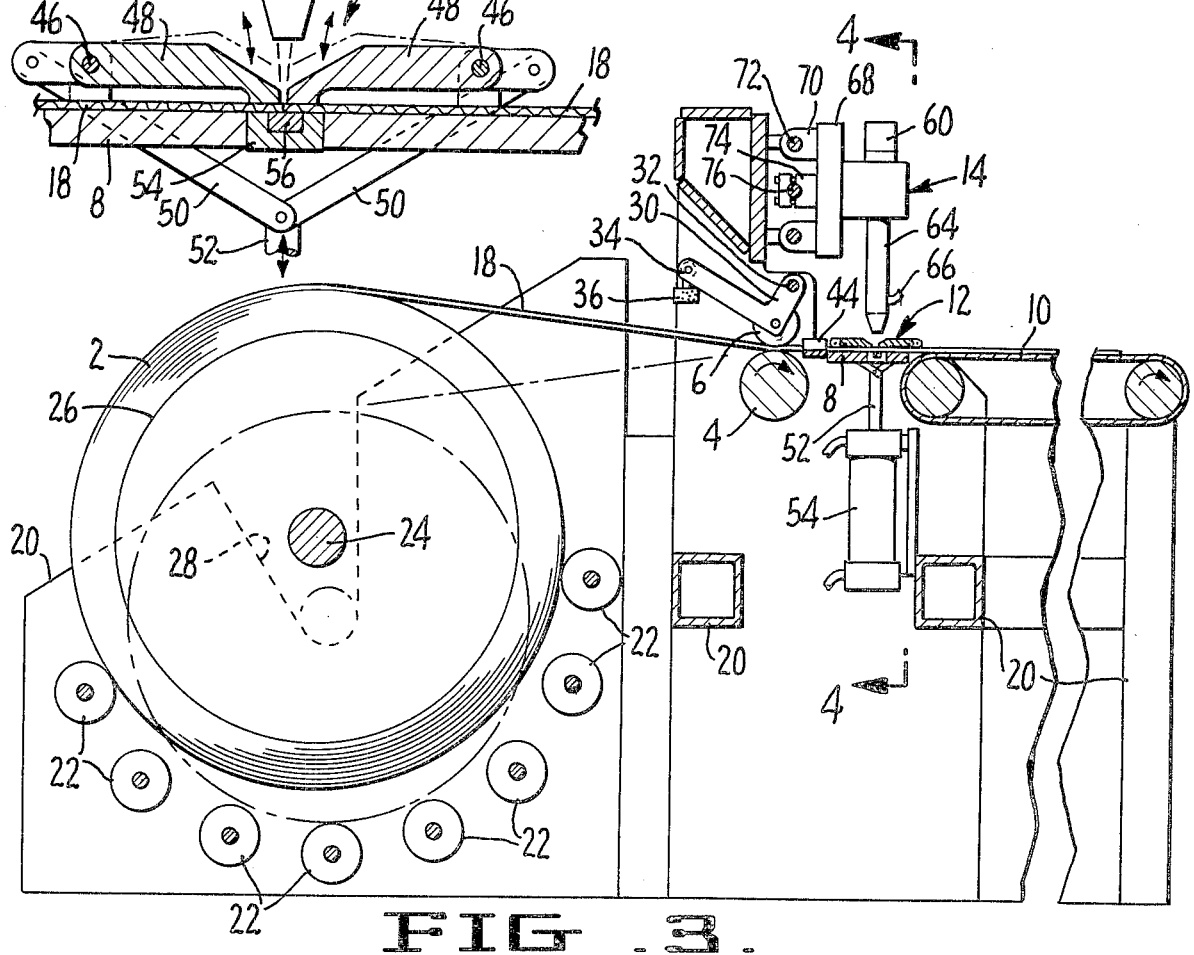
FIG. 5.
FIG. 3.

APPARATUS AND METHOD FOR CUTTING AND HEAT SEALING WOVEN THERMOPLASTIC MATERIAL

BACKGROUND OF THE INVENTION

Woven thermoplastic materials such as nylon and Dacron and many others have been commercially available for many years. Because of the differences between such materials comprised of thermoplastic filaments and those of natural fibers, it has been necessary to develop many special techniques for working with such materials. Several of these problems stem from the slippery nature of the filaments themselves, which characteristic causes the woven materials to ravel and fray readily when the material is cut or severed.

To overcome these problems, various techniques and apparatus incorporating the use of heat have been developed such that the various filaments of the thermoplastic material may be fused together during the severing in order to restrain such raveling. Exemplary of such apparatus are those that have been disclosed in various patents, such as U.S. Pat. Nos. 3,931,491, 3,808,672, 3,880,201, 3,313,323 and 3,174,515. One patent of particular interest is that to Siclari et al, U.S. Pat. No. 3,757,077. This patent discloses an arrangement for cutting strands of fibers which are held between two belts and exposed to a laser beam through apertures in at least one belt. However, the Siclari apparatus does not address one of the principal problems of the application of heat to such a cutting operation. Specifically, the prior art apparatus provides no means for restraining the flaring of the ends of the filaments which commonly occurs when heat is applied to such filaments.

The flaring problem common to heat sealing the ends of such thermoplastic filaments is undesireable for materials that may come in contact with articles of clothing, since the flared filaments tend to present a rough surface to the severed end of the material, thus presenting a substantial danger of snagging clothing which comes into contact with such rough, heat-sealed cuts. This problem has been quite common in the manufacture of automotive seat belts in which the belts are cut from lengths of woven nylon webbing. Heretofore the severed ends of such seat belts frequently presented an undesirably rough surface which may be damaging to the clothes of users of such belts.

SUMMARY OF THE INVENTION

To overcome the foregoing disadvantages of prior art methods and apparatus for cutting lengths of woven thermoplastic material, it is an object of this invention to provide such a method and apparatus which provides a substantially smooth cut with relatively little of the undesired flaring. To achieve this and other objects of this invention, an apparatus and method is disclosed for cutting and heat-sealing the ends of lengths of woven thermoplastic material. Such method includes feeding a predetermined length of the material from a supply across a supporting surface, releasably clamping the material lengths against the supporting surface, with clamping means defining a gap extending transversely of the material lengths, directing a laser beam against the material exposed through the gap to remove portions of the material so exposed and to melt together the portions of the material immediately adjacent to the removed portion, and moving the laser beam transversely of the material lengths along the gap, whereby the material exposed to the beam through the gap may be removed and the portions of the material immediately adjacent to the gap may be melted together and thus heat sealed. The laser beam is focused onto the exposed woven material in a spot having a diameter generally equal to the gap width, the laser beam being of sufficient power to remove portions of the material exposed to the beam.

BRIEF DESCRIPTION OF THE DRAWINGS

The present invention will be disclosed in detail with respect to a particularly preferred embodiment in which FIG. 1 is a plan view of the apparatus of this preferred embodiment;

FIG. 2 is an end sectional view taken along line 2—2 of FIG. 1 and illustrated at a larger scale for clarity;

FIG. 3 is a side sectional view taken along line 3—3 of FIG. 1;

FIG. 4 is a perspective view of a portion of the structure illustrated in FIG. 3;

FIG. 5 is a fragmentary view at a larger scale of the supporting and clamping structure of the apparatus of FIG. 3; and FIG. 6 is a further enlarged view of the fragment of the apparatus of FIG. 5, illustrating the relationship between the laser beam and clamping means.

DESCRIPTION OF A PREFERRED EMBODIMENT

A particularly preferred embodiment of the present invention is illustrated in the plan view of FIG. 1, the elevation views of FIG. 2 and 3 and the perspective sectional view of FIG. 4. The basic elements of this apparatus include a supply in the form of a plurality of rolls 2 of woven thermoplastic material, such as nylon webbing, motor driven feed roller 4 having a plurality of pinch rollers 6 cooperating therewith to feed the woven material onto a supporting surface formed by table 8 and thence to means, such as an elongated conveyor belt 10, for removing the material from the supporting surface 8. Clamping means, generally indicated by the numeral 12, are positioned above the supporting surface 8 with means 14 for directing the beam from a laser 16 being positioned above the clamping means 12 and mounted to means for moving the laser beam directing means transversely of the length of woven material 18 fed from the supply rolls 2. All of these various elements may conveniently be supported on a frame 20.

As best illustrated in FIG. 3, the supply rolls 2 may conveniently be supported on a plurality of segmented rollers 22, which are mounted to the supporting frame 20 in an arcuate configuration. By this configuration, the rolls 2 of the woven material may be supported by two or more of the rollers 22 at any time, despite the ever-decreasing diameter of those rolls, as indicated in both the solid line representation and the broken line representation of the rolls in FIG. 3. Since each of the rolls 2 of material conveniently begin at about the same diameter and conveniently are consumed at substantially the same rate, a shaft 24 is provided extending throught the center of the rolls of material and also extending through the spacers 26 provided between each roll. The shaft 24 is loosely received within the V shaped slot 28 formed in the supporting frame, although the engagement between the rolls 2 and the rollers 22 generally serve to support the rolls.

From the supply rolls 2, the woven thermoplastic material 18 is fed across selectively activated feed roll 4 and onto the supporting surface defined by the upwardly facing portion of support table 8. Suitably, one pinch roller 6 is provided for each strip 18 of the woven material, holding that woven material in driving contact against the feed roller 4. Each such pinch roller 6 may suitably be mounted to an arm 3 which is mounted by means of pivot shaft 32 to the support frame 20. An extension of the support arm 30 projects outwardly and terminates in the attachment 34 from which weight 36 may be hung to increase the force with which the pinch roller 6 urges the material 18 into contact with the selectively driven feed roller 4, thus to ensure positive feeding of the material. It may be noted that feed roller 4 suitably is a continuous roller extending beneath all of the strips of woven material 18. This roller may be driven by any conventional means, such as electric motor 38, shown in FIG. 2.

Feed roller 38 is selectively driven to intermittently advance strips of predetermined length of the woven material 18 for cutting. The control for this motor 38 suitably may be in the form of a tachometer generator or other well-known form of rotary encoder 40 mounted to one of the pinch rollers 6 to provide a signal to a conventional control unit 42, indicating the number of revolutions of the pinch roller 6 and thus the length of material fed from the supply rolls 2. Thus, by this rotary encoder 40 a signal may be provided to the control unit 42 to activate the feed roller motor 38 only until the desired length of material 18 has been fed from the supply roll.

From the feed roller 4 the material is fed through guides 44, which maintain the proper direction of feed, onto the supporting surface of the platform 8, which is also mounted to the frame 20. Mounted to the platform 8 by pivotal connections 46 are clamping members 48, best shown in FIGS. 4 and 5. These clamping members 48 are preferrably fabricated of steel and are pivotally movable between the clamped position shown in the solid line representation and the release position shown in the broken line representation of FIG. 5. These clamping members 48 are also pivotally connected to actuating arms 50 which are themselves pivotally connected to shaft 52 of a convenient actuating means, such as the air cylinder 54, or a suitable solonoid. The actuation of shaft 52 in the direction shown by the arrows of FIG. 5 thus serves to move the clamping members 48 between their release position and their clamping position, bearing against the strips 18 of woven material. The actuators 54, in the form of air cylinders are suitably connected to a pressurized source of air though controllable solonoid valves (not shown) which, themselves, are connected into the control unit 42, as shown schematically in FIG. 2. Thus, the control unit 42 may effect the release of the clamping members 48 during the time that additional material is to be fed by the power driven feed roller 4 onto the support 8, then may clamp that material in place for cutting.

Clamping members 48 are mounted in spaced relationship with one another as shown in FIG. 4. The space between the clamping members 48 defines a gap of predetermined size between the mutually opposed extremities of the clamping members 48. This gap, exaggerated for purposes of clarity in the drawings, is suitably on the order of 0.005 inches wide and extends substantially the full length of the clamping members 48 to expose a like width of the woven material 18, as illustrated in the enlarged, fragmentary view of FIG. 6. Preferably the mutually opposed extremities of the clamping members 48 are beveled such that they angle downwardly and toward one another, as illustrated in FIG. 6, for purposes to be described below.

Immediately below the gap formed between the two clamping members 48 is provided a channel member 54 mounted within the platform 8, with a separate member 56 received longitudinally slidably within that channel member 54. This slidably received member 56 is connected at one of its longitudinal extremities to the shaft of a suitable reciprocating actuator, such as a solonoid 58. Thus, upon actuation of the solonoid 58 (which is connected to the control unit 42 as illustrated in FIG. 2) this member 56 may be moved selectively and reciprocatingly longitudinally of the channel member 54, and thus generally transversely of the material length 18. The function of this reciprocating movement will be described further below.

From the supporting platform 8 the strips of material 18 are then fed onto removing means, such as conveyor 10. This conveyor 10, which suitably is of conventional structure and may desirably be continuously running in the direction indicated by the arrows of FIGS. 3 and 4, frictionally engages the lengths 18 of the material, by virtue of the material resting on the conveyor surface. Thus, this conveyor 10 serves to lay the length 18 of material out extending away from the clamping structure. Additionally, when severed lengths are released from the clamping structure, this conveyor serves to carry those severed lengths away from the clamping structure to a hopper or other suitable collecting means.

The means provided for severing the desired lengths from the strips 18 of material fed from the supply rolls 2 suitably comprises a laser of sufficient power, such as a Coherent, Inc. EVERLASE 350 $CO_2$ laser, with suitable beam directing and focusing structure. This laser 16 may be suitably arranged parallel to the conveyor 10, with a folding mirror 59 on the output to direct the laser output beam generally transverse to the direction of feeding of the woven material 18. Additional beam directing means have been provided in the form of a second folding mirror assembly 60, which redirects the beam downwardly toward the platform 8, and suitable focusing optics 62 for focusing the beam to the desired spot size. A suitable shroud 64 is provided both for mounting the focusing optics 62 and for enclosing the beam as it is directed toward platform 8. As illustrated in FIG. 6, this shroud 64 may also be provided with a supply of pressurized gas, suitably nitrogen, from a conduit 66 connected to a suitable external source, this pressurized gas serving to disperse fumes and residue resulting from the operation of the apparatus.

The folding mirrors 60, focusing optics 62 and shroud 64 are all mounted to a carriage 68. This carriage 68, in turn is mounted by means of brackets 70 holding means such as ball bushings to carriers, suitably in the form of parallel bar members which extend generally parallel to and spaced from the platform 8. By the engagement between the ball bushing-carrying brackets 70 and the support member 72, the carriage is supported for relatively low friction movement back and forth parallel to the support platform 8 and the clamping members 48. Means also are provided for moving the carriage 68 and its associated optical components transversely of the lengths of material which are exposed through the gap between the clamping member 48. This carriage moving means suitably may be in the form of an internally threaded member 74 attached to the carriage 68 and engaging a lead screw 76 selectively driven by a suitable motor 78. This motor 78 is selectively energized and activated by the control unit 42 to effect selective transverse movement of the carriage 68 and its associated beam directing optical components, all in a manner to be described below.

The optical components 60 and 62 mounted to the carriage 68 are suitably positioned such that the output beam from the laser 16 is focused directly into the gap between the clamp members 48. This beam suitably is focused into a spot having a diameter generally equal to the gap width, with the beam being directed generally normal to the surface of the platform 8 and thus to the strips of material 18, as illustrated in FIG. 6.

Since a particularly preferred embodiment of the apparatus of this invention has been described above, the method of operation will now be described in detail. As noted above, with respect to this preferred embodiment, the woven thermoplastic material supplied to this apparatus may suitably be in the form of a plurality of adjacent parallel reels of material, such as nylon webbing approximately two inches wide and having a thickness of 0.05 inches, such material conventionally being used for the manufacture of automotive seatbelts. Obviously, however, both the method and apparatus of this invention could be used equally well with a greater or lesser number of rolls of such material, or even a single broad roll of material. This material 18 is fed from the supply roll 2 between the drive roller 4 and pinch rollers 6, which may be pivoted out of the way for loading. The material is then fed through guides 44, across the supporting surface of platform 8 below the clamping members 48 and onto the removing conveyor belt 10.

When the operation of this method and apparatus is initiated, the clamping members 48 are in their release position, the removing conveyor 10 is continuously running in the direction indicated by the arrow and the carriage 68 is at one extreme of its travel along the guides 72. Initially, the strips of material 18 may be brought just even with the gap between the clamping members 48 prior to the initiation of operation of the equipment. At that point, a desired length for the material to be cut may be set into the control apparatus 42 in a conventional and well-known manner, and the system then activated. Upon this activation, the motor 38 driving the feel roll 4 will be activated to feed the predetermined length of material across the platform, with the rotary encoder 40 detecting the length of material being fed. When the predetermined amount has been fed out, a signal from the rotary encoder 40 causes the control unit 42 to stop rotation of the roller and to activate the actuators 43 to bring the clamping members 48 into their clamping engagement with the material 18, as shown in the solid line representation of FIG. 5 and FIG. 6. Upon the occurrence of this clamping the control unit 42 then activates the laser 16, which then provides an output beam, which is directed by the optical components described above, at the material exposed within the gap between the clamping members 48. At this time the lead screw actuating motor 78 is also energized to drive the lead screw 76 and thus move the carriage and its associated optical components transversely of the material clamped against the platform 8, such movement typically being at speeds in the neighborhood of 4-8 inches per second. The power density of the laser spot directed through the gap and the rate of travel are such that the energy from the laser beam may vaporize or otherwise remove the material exposed to the beam through the gap and fuse the ends of the filaments immediately adjacent the portions of the material which are removed.

Suitably, substantially all of the material exposed through the gap is removed by the laser beam energy. Thus, the remaining material is clamped directly beneath the clamp members 48. This clamping action thus effectively serves to reduce or eliminate most of the undesired flaring experienced in the heat cutting of such material by prior art methods and apparatus. The traversing of the carriage 68 continues until the beam has passed across all portions of the material exposed through the gap. During this traverse of the carriage and beam directing means, a suitable gas such as nitrogen may be introduced through conduit 66 and expelled out the lower end of the shroud 64 to clear away smoke or other residue during the cutting.

Upon completing this traverse, the lead screw drive motor 78 is de-energized by control unit 42, suitably by the engagement between the carriage 68 and appropriate limit switches (not shown).

Since the thermal cutting of thermo-plastic material involves a certain amount of melting of that material, a portion of that melted material may tend to stick to the supporting surface directly below the severed ends of the material. As illustrated in FIGS. 5 and 6, the portion of the supporting surface directly below the severed ends suitably is the reciprocatingly mounted member 56, which may be fabricated of a material such as stainless steel. It may thus be necessary to break the woven material free from any such sticking. Accordingly, at the end of the traverse by carriage 68, the solonoid 58 is momentarily actuated by the control unit 42 to effect a brief and suitably small displacement reciprocating motion of the member 56 with respect to the channel member 54, within which it is slidably mounted. Since the woven material 18 is still clamped in position, this reciprocation of the member 56 serves to break it loose from any sticking engagement with the severed ends of the material 18. Upon completion of this brief reciprocation, the actuator 58 is deactivated and the control 42 causes the clamping member actuators 54 to move the clamping members 48 to the released position illustrated in the broken line representation of FIG. 5. At this point the entire cycle may be repeated as the severed lengths of the woven material 18 are transported by the conveyor 10 away from the clamping member and into appropriate receiving means. Since the laser beam effects the severing of the material during one pass across the material, the reversible motor 17 may be controlled to move the carriage 68 to the right (in FIG. 2) during one cutting sequence, back to the left in a subsequent cutting sequence, back to the right in the next cutting sequence, and so on, without the need for resetting the carriage at one particular end of this movement for each pass.

While the foregoing illustrates both a preferred embodiment of apparatus for practising this invention and a preferred method for practicing the invention, it is to be recognized that numerous modifications of this apparatus and method, all within the scope of the invention, will readily appear to those skilled in the art. Accordingly, the scope of this invention is to be limited solely by the claims appended hereto.

What is claimed is:

1. Apparatus for cutting and heat sealing the ends of lengths of woven thermoplastic material, comprising feeding means selectively activated for feeding predetermined lengths of said material from a supply of said material across a supporting surface;

means for releasably clamping said material lengths against said supporting surface, said clamping means including means defining a gap of predetermined width extending transversely of said material lengths to expose portions of said material through said gap;

a laser having an output beam of sufficient power to remove said material portions exposed to said beam and to melt together the portions of said material immediately adjacent said removed portions;

means for directing said laser beam against said material portions exposed through said gap and for focussing said beam onto said material in a spot having a diameter generally equal to said gap width; and means for moving said laser beam directing means transversely of said lengths of material along said gap, while maintaining said focus whereby the material exposed to the beam through the gap may be removed and the portions of the material immediately adjacent the gap may be melted together and thus heat sealed.

2. Apparatus according to claim 1 further comprising means for selectively activating said feeding means when said clamping means are released, whereby the feeding means may feed the material into the area of the clamping means for clamping and cutting.

3. Apparatus according to claim 2 further comprising means for removing the cut lengths of said material from said area of said clamping means after said lengths have been cut and said clamping means have been released, whereby the cut lengths may be removed to make way for feeding additional lengths of the material into the area of the clampings means from the material supply.

4. Apparatus according to claim 3 wherein said removing means comprises means frictionally engaging said material lengths outwardly of said clamping means, whereby release by the clamping means permits the removing means to carry the cut lengths of material away from the clamping means.

5. Apparatus according to claim 4 wherein said removing means comprises a conveyor having a surface positioned to receive said material lengths fed through said clamping means, said conveyor surface continuously moving in a direction away from said clamping means.

6. Apparatus according to claim 1 further comprising means for guiding the edges of said material lengths fed from said supply toward said clamping means.

7. The apparatus of claim 1 wherein said supporting surface comprises a member extending generally parallel to and directly below said gap and being mounted for reciprocating movement generally transversely of said material lengths, and means for selectively and reciprocatingly moving said member generally transversely of said material lengths, whereby the selective reciprocating movement may serve to break the member free from any material lengths that become stuck thereto.

8. The apparatus of claim 1 wherein said clamping means comprise at least two clamping members movable toward and away from said supporting surface and spaced apart in facing relationship with one another across said gap, and clamp actuating means for selectively moving said clamping members toward said supporting surface for clamping said material and away from said surface for releasing said material from said clamping.

9. Apparatus according to claim 8 wherein the portions of each said clamping member adjacent said gap are angled toward said gap and toward said supporting surface.

10. Apparatus according to claim 1 wherein said laser beam directing means comprises first means for directing said laser beam in a first direction generally parallel to said supporting surface and spaced from said supporting surface and said woven material, and second means for redirecting said laser beam from said first direction to a second direction in which said beam impinges upon a portion of said material exposed through said gap, said second directing means being mounted to said apparatus for movement along and spaced from said gap, whereby the laser beam may be caused to impinge upon different portions of the woven material exposed through the gap by the movement of the second directing means along the gap.

11. A method of cutting and heat sealing the ends of lengths of woven thermoplastic material, comprising the steps of feeding a predetermined length of said material from a supply across a supporting surface, releasably clamping said material lengths against said supporting surface by urging portions of clamping means against longitudinally spaced portions of said material lengths and thence toward said supporting surface, the space between said clamping means portions defining a gap of predetermined width through said material es exposed, directing a laser beam against said material portions exposed through said gap, said laser beam being focussed onto said exposed material in a spot having a diameter generally equal to said gap width and said beam being of sufficient power to remove portions of said material exposed to said beam and to melt together the portions of said material immediately adjacent said removed portions, and moving said laser beam transversely of said material lengths along said gap, whereby the material exposed to the beam through the gap may be removed and the portions of the material immediately adjacent the gap may be melted together and thus heat sealed.

12. The method of claim 11 further including the step of releasing said clamping of said material length after said cutting and heat sealing and then removing said cut material length from said supporting surface to make way for feeding and cutting additional lengths of materal.

13. The method of claim 12 further comprising the step, interposed between said cutting and heat sealing and said releasing, of moving in a direction generally transverse to said material lengths the portion of said supporting surface which is adjacent said gap, whereby any of the cut and heat sealed material lengths which may stick to the supporting surface adjacent the gap may be broken free.

14. The method of claim 11 wherein said laser beam, in the cutting step of successive cycles of feeding, clamping, cutting, and releasing said material lengths, is moved between a first position adjacent a first end of said clamping means gap and a second position adjacent the opposite end of said gap, said laser beam being moved in one direction during one said cycle and then in the opposite direction during the following said cycle.

* * * * *